US006807648B1

(12) United States Patent
Cansever et al.

(10) Patent No.: US 6,807,648 B1
(45) Date of Patent: Oct. 19, 2004

(54) VARIABLE-STRENGTH ERROR CORRECTION IN AD-HOC NETWORKS

(75) Inventors: Derya H. Cansever, Southborough, MA (US); Arnold M. Michelson, Westwood, MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/394,741

(22) Filed: Sep. 13, 1999

(51) Int. Cl.[7] .............................................. H03M 13/00
(52) U.S. Cl. ...................... 714/776; 714/704; 714/782; 714/784; 714/752
(58) Field of Search ................................ 714/776, 752, 714/701, 704, 782, 784, 746; 370/473

(56) References Cited

U.S. PATENT DOCUMENTS

| | | | |
|---|---|---|---|
| 5,327,438 A | * | 7/1994 | Okuyama |
| 5,533,021 A | | 7/1996 | Branstad et al. ............ 370/60.1 |
| 5,570,378 A | | 10/1996 | Inoue et al. ................ 371/37.1 |
| 5,608,738 A | * | 3/1997 | Matsushita |
| 5,844,918 A | * | 12/1998 | Kato |
| 6,084,888 A | * | 7/2000 | Watanabe et al. |
| 6,119,263 A | * | 9/2000 | Mowbray et al. ............ 714/781 |
| 6,263,466 B1 | * | 7/2001 | Hinedi et al. |
| 6,357,029 B1 | * | 3/2002 | Sinha et al. ................. 714/752 |

FOREIGN PATENT DOCUMENTS

| | | | |
|---|---|---|---|
| CA | 2159440 | 3/1996 | |
| EP | 0713347 A2 | 6/1995 | ........... H04Q/11/04 |
| EP | 0 721 267 A2 | 7/1996 | |
| EP | 0 748 124 A2 | 12/1996 | |

OTHER PUBLICATIONS

D. Raychaudhuri, "Wireless ATM: An Enabling Technology for Multimedia Personal Communication," Wireless Networks, vol. 2, No. 3, Aug. 1996, pp. 163–170.

G.C. Miller et al., "Reliable End-to-End Communication in the Tactical ATM Environment," Proc. of the 15th Annual Military Communication Conference, 10/21–24/96, pp. 144–150.

J. Farserotu et al., "TCP/IP Over Low Rate ATM–SATCOM Links," Proc. of the a5th Annual Military Communication Conference, 10/21–24/96, pp. 162–167.

P. Goyal et al., "Start–time Fair Queuing: A Scheduling Algorithm for Integrated Services Packet Switched Networks," IEEE/ACM Transactions on Networking, 5(5) 690–704, Oct. 1997.

T.S. Ng et al., "Packet Fair Queuing Algorithms for Wireless Networks with Location dependent Errors," Technical Report available in ftp:/ftp.cs.cmu.edu/user/hshangINFOCOM98.ps.Z.

D. Cansever et al., Error Control and Resource Allocation in Mobile ad–hoc Networks, ATIRP 3$^{rd}$ Annual Conference Proc., Feb. 1999.

Satoru Aikawa et al., "Forward Error Correction Schemes for Wireless ATM Systems," 1996 IEEE International Conference on Communications (ICC), Covering Technologies for Tomorrow's Applications, vol. 1, Jun. 23, 1996, pp. 454–458.

P. Torres et al., "Adaptive Error Control Coding for a Mobile Broadband System," 1996 IEEE 46$^{th}$ Vehicular Technology Conference, vol. 3, Apr. 28, 1996, pp. 1751–1755.

Timothy Piper et al., "ATM–Providing Broadband Services to the Warrior," Proceedings of the 1994 Tactical Communications Conference, vol. 1, May 10, 1994, pp. 217–224.

* cited by examiner

Primary Examiner—Phung M. Chung
(74) Attorney, Agent, or Firm—Leonard C. Suchyta; Joel Wall; Foley Hoag LLP

(57) ABSTRACT

Systems and methods for encoding packetized data include applying different codings to the header and the payload. The header of a data packet is encoded for error correction separately from the payload of the data packet. The use of separate error correction techniques for the header and payload of a packet permits optimization of each for use in a data network, and more particularly, in a wireless data network.

21 Claims, 4 Drawing Sheets

VARIABLE-STRENGTH ERROR CORRECTION IN AD-HOC NETWORKS

STATEMENT REGARDING FEDERALLY SPONSORED RESEARCH OR DEVELOPMENT

The present invention was made at least partly with government funds under ATIRP Contract DAAL-01-96-2-0002. The government may have certain rights in the invention.

BACKGROUND OF THE INVENTION

1. Field of the Invention

This application relates to the field of reliable and efficient data networking, and more particularly to the field of variable-strength error correction and resource allocation in a noisy data networking environment.

2. Description of Related Art

Throughput of a digital data communication channel may be adversely affected by an excessive Bit Error Rate (BER) due either to the inherent characteristics of the channel or to interference caused by other users of the channel. Error correction coding schemes may improve the reliability of data transmissions by reducing the delivered bit error rate. Error correction coding allows for correction of received data. Correcting the data in this manner reduces the amount of re-transmissions, which is generally inefficient in that it includes both a request for re-transmission from the data recipient and a re-transmission by the original sender of the data. Such re-transmissions use physical bandwidth of the channels that would otherwise be available data communication.

Using error correction coding adds data overhead and thus also reduces the amount of physical bandwidth available for data transmission. Accordingly, the choice of an error correction code involves balancing expected gains of improved channel accuracy (with a corresponding reduction in re-transmitted data) against the overhead introduced by the error correction code. Note that, a particular code's resilience to errors (i.e. the number of errors which can be corrected per a given number of bits transmitted, also sometimes referred to as a code's "strength") is proportional to the overhead introduced by the code. Generally, a strong code will introduce more overhead than a weak code. Thus, using a code that is too weak could cause too many re-transmissions due to too many errors in the received data while using a code that is too strong could increase overhead unacceptably.

In over-the-air transmission of TCP/IP packets, it is sometimes difficult to use an acceptable code strength due to the criticality of receiving the TCP/IP header intact. The header contains important information about the packet, including the size of the data being transmitted (i.e., the payload), the packet number (used to identify and sequence the packets) the data source, and the data destination. If a packet header is damaged, it may be difficult to request a retransmission since critical packet information may be lost. Thus, in some instances, using an error correction code that is strong enough to provide an acceptable delivered BER for the packet header may increase the overhead unacceptably when applied to the entire packet. However, using a code that is too weak could result in too many requests for retransmission, since receipt of the packet header without any errors is important.

Furthermore, in a network of digital radios, a channel is often shared by multiple terminals. Some of the applications that are being run over these terminals have quality of service requirements. For example, IP voice requires a minimum bandwidth, e.g., 16 kilobits per second, to be clearly understood by the end user. An effective way to share a common channel among multiple terminals, and still fulfill quality of service requirements, is to make use of packet scheduling algorithms. These algorithms ranks IP packets per their quality of service requirements, and schedules their transmission time accordingly. However, use of error correcting codes reduces the available physical bandwidth due to the associated overhead. In an environment where a channel is shared by multiple terminals, several applications with diverse quality of service requirements may have to be supported. Since these applications will require different levels of coding, some applications may consume more bandwidth than others. If the packets scheduling algorithm does not take into account differences in consumed bandwidth, it may unfairly favor one user over another, or, it may fail to provide the intended bandwidth to some of the users.

SUMMARY OF THE INVENTION

The invention includes efficient error correction and resource allocation over a communication channel. In once aspect, the invention includes encoding packetized data for transmission over a communication channel by encoding a header of a data packet with a first error correction code to provide an encoded header, encoding a payload of the data packet with a second error correction code to provide an encoded payload, the second error correction code being different from the first error correction code, and combining the encoded header and the encoded payload to provide an encoded data packet. In another aspect of the invention, the overhead resulting from the use of error correcting codes is used as an additional input parameter to the packet scheduling algorithm. As a result, bandwidth allocation will be fair, and independent of fluctuations that would result from the error correcting code overhead.

According to the present invention, encoding packetized data includes encoding a header of a data packet with a first error correction code to provide an encoded header, encoding a payload of the data packet with a second error correction code to provide an encoded payload, the second error correction code being different from the first error correction code, and combining the encoded header and the encoded payload to provide an encoded data packet. encoding packetized data may also include transmitting the encoded data packet over a wireless network. The header may be a TCP/IP packet header or the packet may a UDP packet. A strength of the second error correction code may be dependent on a bit error rate of a communication channel used for transmitting the encoded data packet. The first error correction code may be a binary BCH code. The second error correction code may be a Reed-Solomon code.

According further to the present invention, decoding packetized data includes decoding a header of a data packet using a first error correction code to provide an unencoded header, decoding a header of the data packet using a second error correction code, the second error correction code being different from the first error correction code, and combining the unencoded header and the unencoded payload to provide an unencoded data packet. Decoding packetized data may also include receiving the data packet over a wireless network. The unencoded header may be a TCP/IP packet header or the packet may be a UDP packet. A strength of the second error correction code may be dependent on a bit error rate of a communication channel used to transmit the unencoded data packet. The first error correction code may be a binary BCH code. The second error correction code may be a Reed-Solomon code.

According further to the present invention, a digital data signal embodied on a wireless network carrier wave includes an encoded packet header encoded using a first error correction code and an encoded payload encoded using a second error correction code, the second error correction code different from the first error correction code. The first error correction code may be a binary BCH code. The second error correction code may be a Reed-Solomon code.

According further to the present invention, encoding voice data includes encoding a header of a data packet with an error correction code to provide an encoded header and combining the encoded header and the voice data to provide an encoded data packet. Encoding voice data may also include transmitting the encoded data packet over a wireless network. The error correction code may be a binary BCH code. The packet may be a UDP packet.

According further to the present invention, scheduling packets for service includes receiving a plurality of packets, storing the packets, and queuing each of the packets for transmission according to a time of arrival of each of the packets, a quality of service associated with each of the packet, and an amount of error correction encoding applied to each of the packets. A first error correction encoding may be applied to a header of each of the packets. At least some of the packets may be UDP packets and/or TCP/IP packets. A second error correction code, different from the first error correction code, may be applied to a payload of each of the packets.

In additional aspects, the invention may be a system or apparatus using the methods above, or a digital data signal encoded according to the methods above. In one aspect, the invention is used in connection with a node of a network. The invention may further include a buffer to queue packets for transmission, each packet being prioritized for transmission according to a bit rate error on a communication channel and a desired quality of service for the packet.

BRIEF DESCRIPTION OF DRAWINGS

The foregoing and other objects and advantages of the invention will be appreciated more fully from the following further description thereof, with reference to the accompanying drawings, wherein.

DETAILED DESCRIPTION OF THE PREFERRED EMBODIMENT(S)

To provide an understanding of the invention, certain illustrative embodiments will now be described, including a wireless network environment using one error correction code for packet headers and another, variable-strength error correction for data packet payloads. However, it will be understood by those of ordinary skill in the art that the methods and systems described herein can be suitably adapted to any data transmission system in which communication channels exhibit continuous variations in quality.

Figure 1:
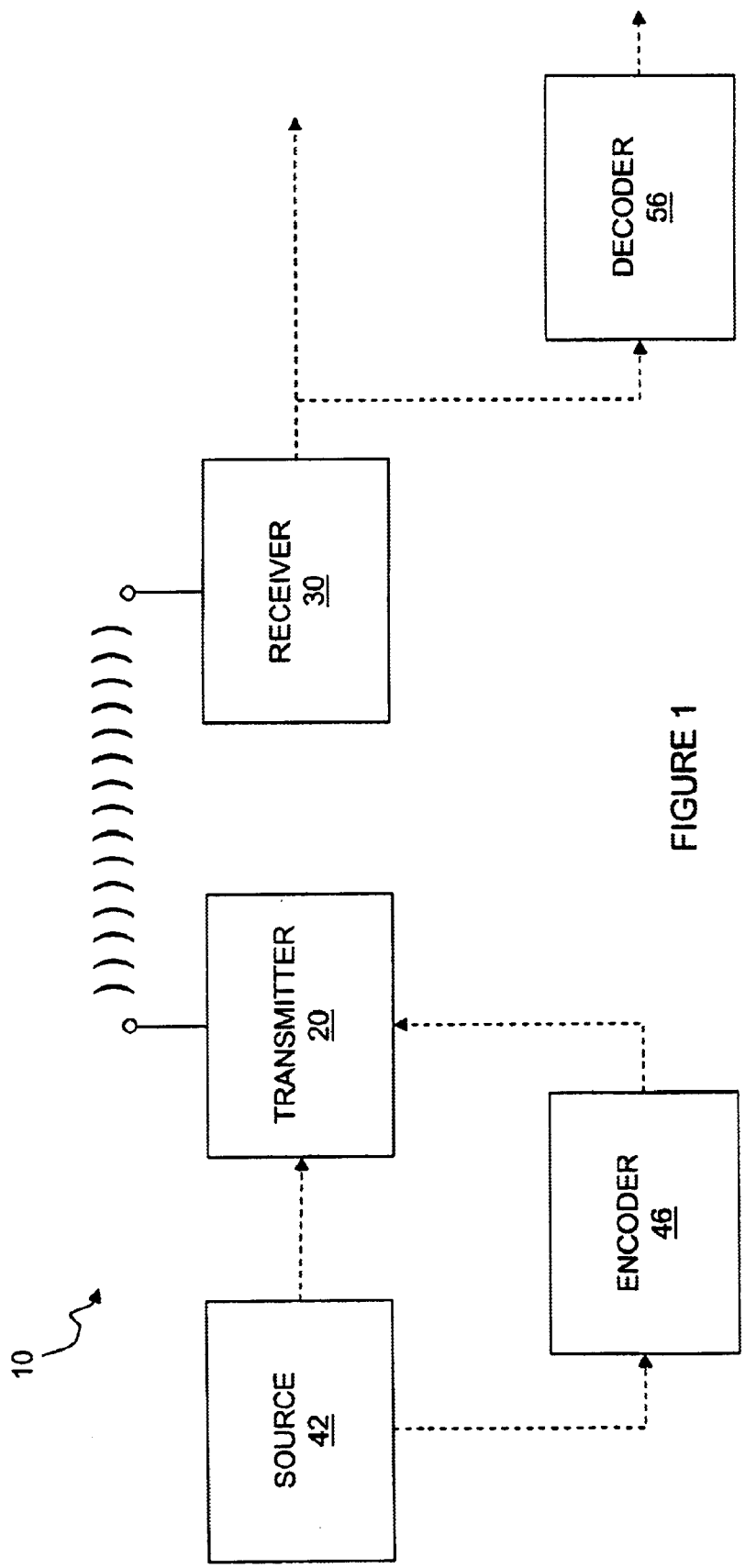
FIG. 1 is a block diagram of a wireless communication system using error correction according to the present invention.

FIG. 1 is a block diagram of a wireless communication system 10 using error correction. The system 10 includes a data transmitter 20 that provides data signals and a data receiver 30 signals provided by the transmitter. The data transmitter 20 may receive digital data packetized, such as TCP/IP packets, from a digital data source 42, which may be any source of packetized digital data including a a packet radio, a personal computer, a bridge or switch to a local area network, or a data router.

The data transmitter 48 modulates digital data in a form suitable for wireless transmission. A number of suitable modulation schemes, such as those based upon frequency-shift keyed modulation, phase-shift keyed modulation, or quadrature amplitude modulation of a radio frequency carrier, are well known and characterized in the art. Any of these or other types of transmission may be used with the data transmitter 48. The data receiver 30 receives and demodulates the modulated signal to recover the digital data.

A data encoder 46 may be interposed between the data source 42 and the transmitter 20. Operation of the encoder 46 is described in more detail hereinafter. When the encoder 46 is used, the demodulated data output of the receiver 30 is provided to a decoder 56 performs an inverse of the operation performed by the encoder 46, except that the decoder 56 also performs error correction, as discussed below.

It will be appreciated that a typical node in a wireless network will perform each of the complementary transmit and receive operations, thereby establishing a two-way communication channel between the stations. In one embodiment, the transmitter 20 and receiver 30 are implemented using radio equipment model AN/GRC-226 provided by Canadian Marconi. The encoder 46 and decoder 56 may be implemented using conventional data processing equipment and techniques along with software that provides the functionality described herein. In other embodiments, the encoder 46 and/or the decoder may be integrated with the transmission and reception equipment. It will further be appreciated that many techniques are known for transmitting and receiving digital data. Any of these techniques may be used with the present invention, provided that at least some of the digital data for transmission is in packetized form, i.e., having a header and a payload. It is specifically contemplated that the invention may be used to encode Internet protocol (IP) traffic over wireless networks.

Figure 2:
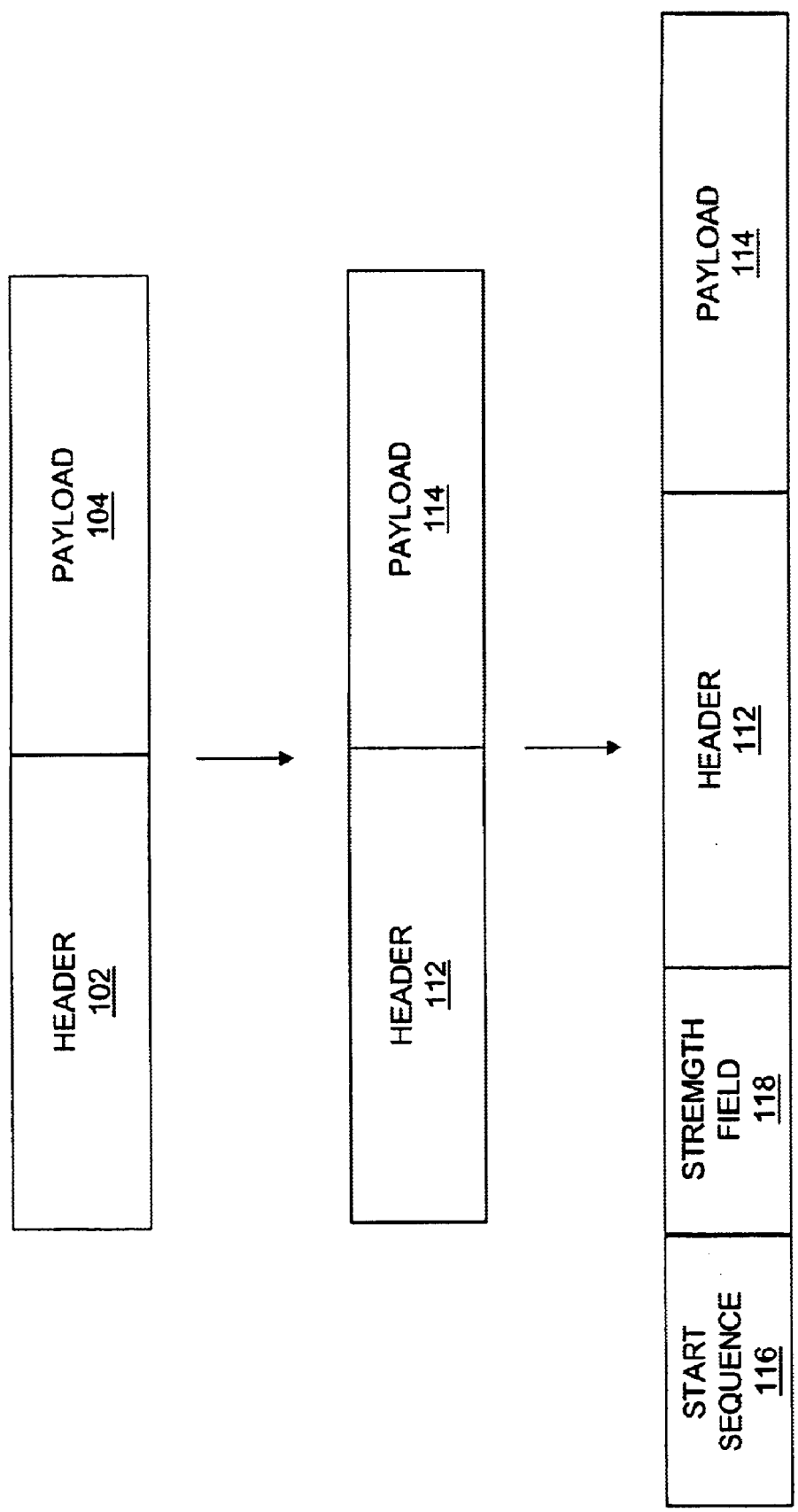
FIG. 2 is illustrates the effect of encoding a data packet according to the present invention.

FIG. 2 shows a data packet 100 that is packetized using the transmission control protocol and the Internet protocol (TCP/IP). The packet 100 includes a header 102 and a payload 104. As is known in the art, the header 102 includes information about the packet 100, including the size of the payload 104, the source and destination of the packet 100, and a packet sequence number for the packet 100.

FIG. 2 also shows an encoded data packet 110 that corresponds to the data packet 100 after encoding has been applied thereto. An encoded header 112 corresponds to the header 102 and an encoded payload 114 corresponds to the payload 104. In a preferred embodiment, a first encoding scheme is applied to the header 102 to provide the encoded header 112 while a second, different, encoding scheme is applied to the payload 104 to provide the encoded payload 114. In one embodiment, BCH error coding is applied to the header 102 while Reed-Solomon coding is applied to the payload 104. However, it will be appreciated that any error correction codes may be adapted to the present invention.

The control and address information in the header 102 may be important to overall network performance. The information may be used facilitate link and network framing for data, and permits quick requests for re-transmission of packets with corrupted payloads. Thus, in order to provide appropriate error correction, the header 102 of the packet 100 is encoded with a strong error correction code to provide the encoded header 112. More specifically, a code is selected to achieve approximately one missed header in one million for a channel with a bit-error ratio (BER) of 0.01. For higher unencoded BER's, i.e, more errors, synchronization of the channel's data link may, in any event, prohibit all coherent transmission of data. The TCP/IP header 102 has forty bytes of information. Applying known formulas for binary BCH code, an acceptable header-error rate in a 0.01 BER rate channel is achieved using (252, 160) t=12 binary BCH code. This employs ninety-two parity bits in addition to the header, or two-hundred fifty-two bits altogether.

The payload 104 is encoded for error correction differently. According to the invention, a less stringent effective BER is required for payload data. An error code is selected to ensure one missed payload in ten thousand for a channel with a BER of 0.001. The length of the payload will typically be longer than the headers, which affects the strength and/or efficiency of error-correction required to ensure a minimum number of missed payloads. A Reed-Solomon code defined on an eight bit alphabet, which identifies errors on an eight-bit character basis, effectively meets this requirement. Assuming a two-hundred byte payload, a (216,200) t=8 Reed-Solomon code may be used. The coding overhead for moderate to large TCP/IP packets using the above coding scheme varies from eleven to sixteen percent of the unencoded packet size.

Note that, once the data has been encoded, it may be difficult for the receiver 30 to properly frame the received data. In that case, it may be useful to include a start sequence 116 with each encoded packet. The start sequence 116 is a predetermined data sequence that the receiver 30 looks for in order to determine the beginning of the encoded packet 110. Once the start sequence 116 has been detected, the decoder 56 decodes the rest of the data. In the case of a false indication of a start sequence, the decoded data will not correspond to a TCP/IP packet (or whatever type of data is expected). In that case, the coding will fail and the receiver 30 will simply continue to scan for the next start sequence 116.

It may further be desired to vary the strength of encoding, and in particular to use less coding where a high quality communication channel exists. Thus the encoded data packet 110 may supplemented with a field 118 indicating the strength of the encoding applied to either the header 102, the payload 104, or both. The strength field 118 provides information to the data decoder 56 to facilitate accurate decoding of the header 112 and the payload 114.

The strength field may further permits dynamic adjustment of error correction strength. In particular, a data decoder 56 using either binary BCH or Reed-Solomon code explicitly recognizes the number of errors corrected in each block of decoded data. If the number of errors is small, it may be possible to provide feedback to the encoder 46 to revise the strength of correction code used by the data encoder 46.

Note that, the technique described herein may work with any other packet type, such as UDP. Also, the strength of the error coding applied to the payload may vary according to the type of data being sent. For example, for voice data, it may not be necessary to apply any coding at all.

Figure 3:
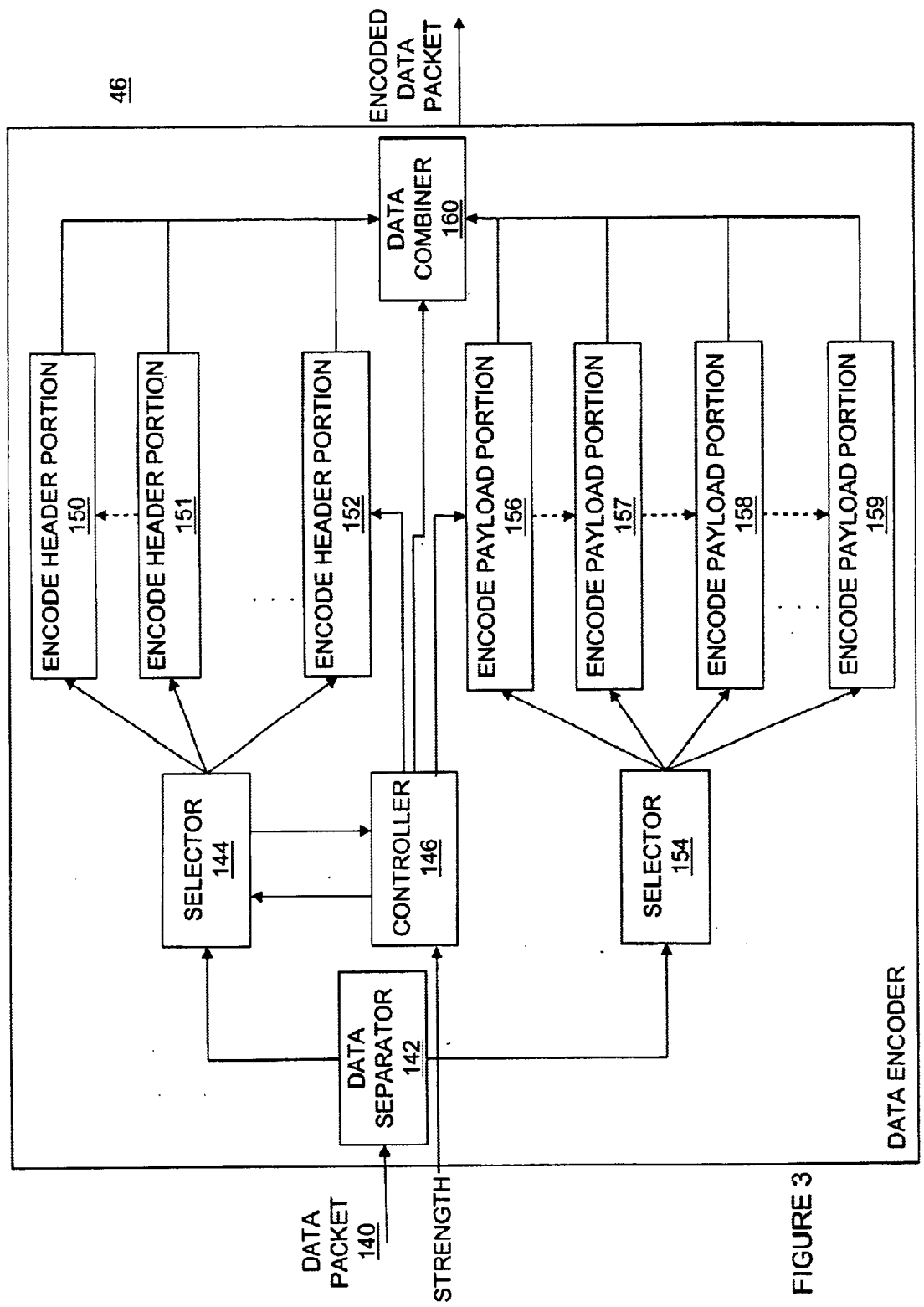
FIG. 3 is a block diagram illustrating an error correcting data encoder according to the present invention.

FIG. 3 illustrates operation of the data encoder 46 of FIG. 1 in greater detail. It will be appreciated that many processes for error correction are well known and characterized in the art. For example, an efficient binary BCH codes may be implemented with a linear, feed-forward shift register, and a complementary decoder may be implemented using the Massey-Berlekamp algorithm. These processes may be implemented using software for general purpose processors, or using programmable digital signal processors, application-specific integrated circuits, programmable logic, or some combination of programmable and discrete logic components. The foregoing may be implemented in software for a general purpose microprocessor or, in some embodiments, using any one of a variety of special purpose signal processors.

The data encoder 46 receives the data packet 100 along a data packet signal line 140. A data separator 142 separates each packet 100 into the header 102 and the payload 104. The data separator 142 can use payload length information available in the header 102 to assist in data separation. The header 102 is transmitted to a first selector 144 which, under control of a controller 146 selects one of a plurality of encoders 150–152 to perform encoding of the header 102 according to a coding strength signal provided to the controller 146. The coding strength signal may be a fixed strength or a strength selected according to a number of errors corrected by the data decoder 56.

The payload 104 is transmitted to a second selector 154 where, under control of the controller 146, selects one of a plurality of encoders 156–159 to perform encoding of the payload 102 according to a coding strength signal provided to the controller 146. A data combiner 160, under control of the controller 146, recombines the encoded header 112 and the encoded payload 114 into the encoded data packet 110. The encoded data packet 110 is provided to the data transmitter 20, as shown in FIG. 1. Complementary operations may be performed at the data decoder 56 to reconstruct the unencoded data packet 100.

Error correction as described above can present particular difficulties in mobile ad-hoc networks. The difficulties arise where such networks provide network services such as quality of service (QoS) routing to allocate communication channels among competing nodes. More particularly, in a channel with a steadily increasing bit error rate, the dynamic error encoding will result in stronger error coding, i.e., longer packets and lower effective bandwidth, at the same time that a QoS aware router is providing more network resources to that channel. Thus a low quality channel may receive a disproportionately large share of physical bandwidth, and vice versa. There is thus addressed below a technique for effective QoS aware routing to accompany an adaptive error correction system according to the invention.

Figure 4:
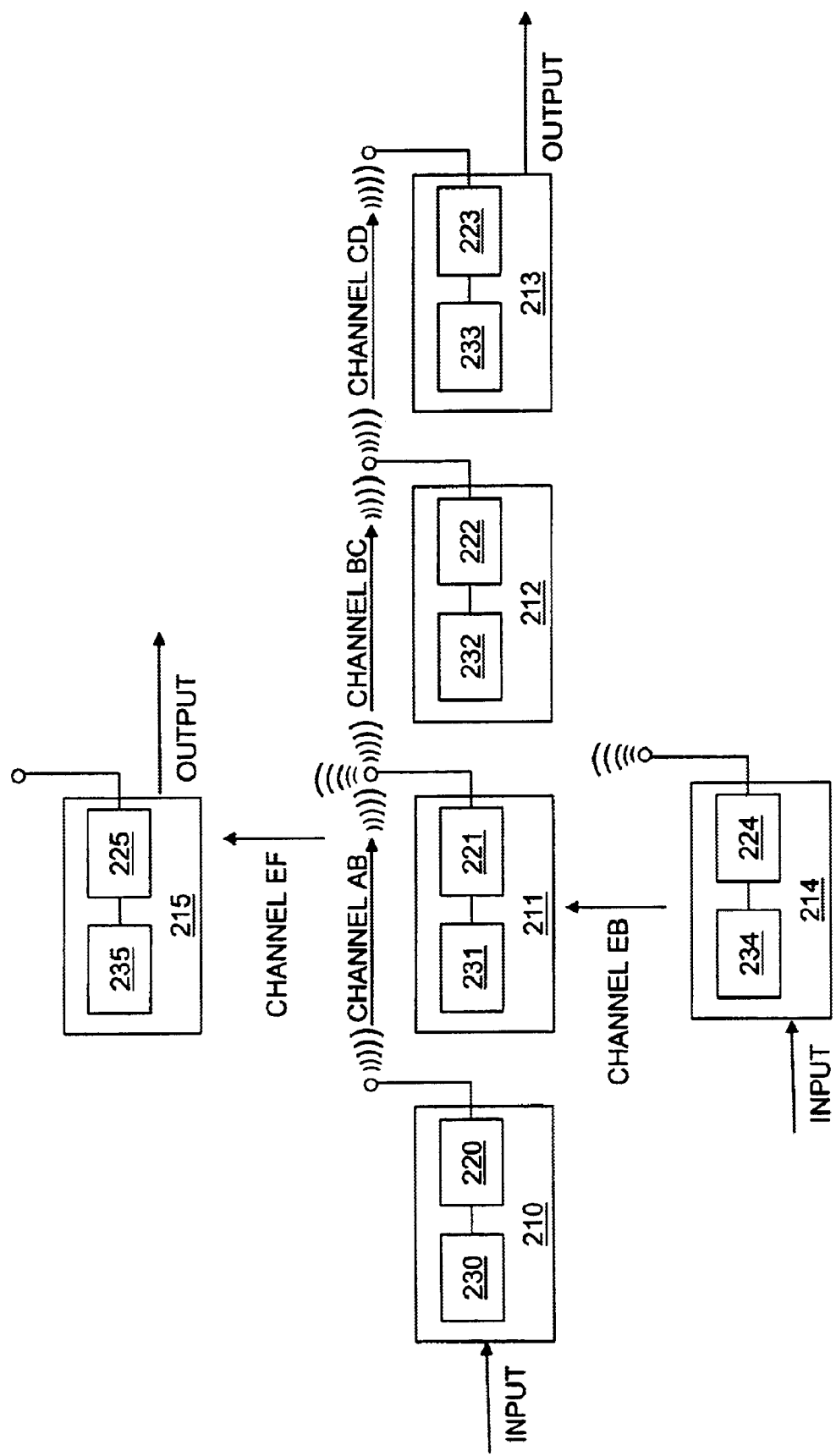
FIG. 4 is a block diagram of an error correcting data decoder according to the present invention.

FIG. 4 shows an ad-hoc wireless communication network 200. The network 200 comprises a plurality of nodes 210–215. Each of the nodes 210–215 includes a data transceiver 220 through 225 which includes a data transmitter and a data receiver as described in reference to FIG. 1. Each node also includes a processor 230–235 which provides network services. Each processor also has an associated memory (not shown) that may serve as a buffer for data packets.

Within the ad-hoc network 200, each of the nodes 210–215 has an IP address, and routing of data is achieved using IP address information available in each packet header 112. Thus each of the nodes 210–215 must perform routing functions. For example, a first packet originating at the node 210 may be addressed to the node 213. The first packet may be generated by the node 210 or received from a first external data source via an input thereto. The node 210 directs the first packet to the node 211, which in turn directs the first packet to the node 212. The node 212 transmits the first packet to the node 213, which may either use the data from the first packet or transmit the data to a first external data destination via an output therefrom. During the same interval, the node 214 may receive a second packet from a second external data source via an input thereto addressed to a second external data source connected to an output of the node 215. The second packet will be transmitted from the node 214 to the node 211, and subsequently to the node 215.

A difficulty may arise at the node 211. Assuming for the sake of illustration that the node 211 can only transmit one packet at a time, the node 211 must prioritize the conflicting traffic. Either the first packet or the second packet is queued in a buffer while the other is transmitted. Quality of Service scheduling algorithms seek to resolve this difficulty by "fairly" allocating network resources to different users according to levels of service associated with packets and any guaranteed minimum transit times for packets between two nodes. Thus, in a QoS system, packets are removed from the queue, not on a first-in-first-out basis, but rather according to a selection algorithm. One such algorithm is the Start-Time Fair Queuing algorithm. It can be shown that using this algorithm, even a node with an error free communication channel to node 211 will be penalized in queuing priority due to highly encoded traffic from a different node with a high-bit-error channel. Thus network resources may be inappropriately directed away from error-free channels.

The following approach is adopted to address QoS issues in the ad-hoc wireless network 200. The approach will be particularly clear with reference to the Fair-Start Time Queuing algorithm, and it will be clear to those skilled in the art that the following technique may be readily implemented using a general purpose processor and appropriate software. On arrival, the j'th packet $p^j_i$ of User i is stamped with a start tag computed as:

$$S(p^j_i) = \text{Max}\{v[A(p^j_i)], F(p^{j-1}_i)\} j \geq 1 \quad \text{Eq. 1}$$

where $A(p^j_i)$ is the arrival time of the packet, and $v[A(p^j_i)]$ is the start tag of the packet already in service at the arrival time of the packet in question. The finish time is defined as:

$$F(p^j_i) = S(p^j_i) + \frac{l^j_i}{\Phi_i \times C \times \rho_i} \quad j \geq 1 \quad \text{Eq. 2}$$

where $l^j_i$ denotes the length of the packet $p^j_i$. Packets that are queued in N separate queues per their user identity are serviced in the increasing order of their start tags. Presence of the term $\rho_i$ in the denominator of Eq. 2 provides that the attenuation User i is subjected to does not impact the bandwidth for other users that share a particular link. With the adjusting factor, any user facing attenuation receives a decreased allocation of network resources in proportion to the attenuation, so that other users sharing the same link are not affected by the direction dependent attenuation.

Returning to the issue of QoS aware routing, each Node j in the network advertises, in addition to its regular reachability Information, the idle capacity, which is $$C_j\left(1 - \sum_i \Phi_i\right),$$

where i is taken over all the active flows that use node j in its path. Note that Node j can compute the idle capacity thereof at any time t, by keeping track of the traffic of Node j. Suppose a new flow arrives at Node j, and the QoS requirement thereof exceeds the Node j's idle capacity. Then, Node j will reject the packets and inform the originator of the flow. Node j will decide that a flow is terminated using timers.

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A method, comprising:

encoding a header of a data packet with a first error correction code to provide an encoded header;

encoding a payload of said data packet with a second error correction code to provide an encoded payload, the second error correction code being different from the first error correction code;

combining the encoded header and the encoded payload of said packet to provide an encoded data packet, wherein the second error correction code is dynamically selected based on a bit error rate of a communication channel used for transmitting the encoded data packet; and prioritizing the encoded data packet for transmission based on an associated strength of encoding, where the strength of encoding is based on at least one of the first error correction code and the second error correction code.

2. The method of claim 1, wherein the communication channel is a wireless network communication channel.

3. The method of claim 1 wherein the header is a TCP/IP packet header.

4. The method of claim 1 wherein the packet is a UDP packet.

5. The method of claim 1 wherein the first error correction code is a binary BCH code.

6. The method of claim 1 wherein the second error correction code is a Reed-Solomon code.

7. The method of claim 1, further comprising:

decoding the header of the encoded data packet using the first error correction code to provide an unencoded header;

decoding the payload of said encoded data packet using the second error correction code to provide an unencoded payload; and combining the unencoded header and the unencoded payload to provide an unencoded data packet.

8. The method of claim 7, further comprising:

receiving the encoded data packet over a wireless network.

9. The method of claim 7, wherein the unencoded header is a TCP/IP packet header.

10. The method of claim 7, wherein the unencoded data packet is a UDP packet.

11. The method of claim 7, wherein a strength of the second error correction code is dependent on a bit error rate of a communication channel used to transmit the unencoded data packet.

12. The method of claim 1, further comprising:

dynamically selecting the first error correction code based on the bit error rate of the communication channel.

13. An apparatus, comprising:

means for determining a fist bit error rate of a communication channel;

means for encoding a header of a first data packet using a first error correction code to provide a first encoded header;

means for dynamically selecting a second error correction code based on the first bit error rate of the communication channel;

means for encoding a payload of the first data packet using the second error correction code to provide a first encoded payload, the second error correction code being different from the first error correction code;

means for combining the first encoded header and the first encoded payload to provide a first encoded data packet;

means for transmitting the first encoded data packet over the communication channel; and means for prioritizing the first encoded data packet for transmission based on an associated strength of encoding, where the strength of encoding is based on at least one of the first error correction code and the second error correction code.

14. The apparatus of claim 13 wherein the first error correction code comprises a binary BCH code.

15. The apparatus of claim 13 wherein the second error correction code comprises a Reed-Solomon code.

16. The apparatus of claim 13 further comprising means for varying a strength of the first error correction code and a strength of the second error correction code in response to changing channel error conditions.

17. The apparatus of claim 13, further comprising:

means for dynamically selecting a first error correction code based on the first bit error rate of the communication channel.

18. The apparatus of claim 13, further comprising:

means for receiving the first encoded data packet over the communication channel;

means for decoding the first encoded header using the first error correction code to provide a decoded header;

means for decoding the first encoded payload using the second error correction code to provide a decoded payload; and means for combining the decoded header and the decoded payload to provide an unencoded data packet.

19. The apparatus of claim 18, further comprising:

means for determining a second bit error rate of the communication channel based on the receipt of the first encoded data packet;

means for encoding a header of a second packet using the first error correction code to provide a second encoded header;

means for dynamically selecting a third error correction code based on the second bit error rate of the communication channel;

means for encoding a payload of a second packet using the third error correction code to provide a second encoded payload, the third error correction code being different from the first error correction code;

means for combining the second encoded header and the second encoded payload to provide a second encoded data packet; and means for transmitting the second encoded data packet over the communication channel.

20. A computer program product disposed on a computer readable medium and having instructions operable to cause a processor to:

encode a header of a data packet with a first error correction code to provide an encoded header;

encode a payload of said data packet with a second error correction code to provide an encoded payload, the second error correction code being different from the first error correction code;

combine the encoded header and the encoded payload of said packet to provide an encoded data packet, wherein the second error correction code is dynamically selected based on a bit error rate of a communication channel used for transmitting the encoded data packet;

queueing a plurality of data packets, wherein the plurality of data packets include the encoded data packet; and prioritizing removal of each of the plurality of packets according to a strength of encoding associated with each of the plurality of packets.

21. The product of claim 20, further comprising instructions to:

dynamically select the first error correction code based on the bit error rate of the communication channel.

* * * * *